(12) United States Patent
Campbell

(10) Patent No.: US 10,004,659 B1
(45) Date of Patent: Jun. 26, 2018

(54) SEXUAL AID

(71) Applicant: Sean Campbell, Laurelton, NY (US)

(72) Inventor: Sean Campbell, Laurelton, NY (US)

(*) Notice: Subject to any disclaimer, the term of this patent is extended or adjusted under 35 U.S.C. 154(b) by 341 days.

(21) Appl. No.: 14/948,359

(22) Filed: Nov. 22, 2015

(51) Int. Cl.
A61H 19/00 (2006.01)
A61H 23/00 (2006.01)
H04N 7/18 (2006.01)

(52) U.S. Cl.
CPC ............ *A61H 19/44* (2013.01); *A61H 19/34* (2013.01); *A61H 23/00* (2013.01); *H04N 7/185* (2013.01); *A61H 2201/0165* (2013.01); *A61H 2201/0188* (2013.01); *A61H 2201/1692* (2013.01); *A61H 2201/5005* (2013.01); *A61H 2201/5023* (2013.01)

(58) Field of Classification Search
CPC ... A61F 5/41; A61F 2/26; A61M 5/20; A61M 13/003
USPC ..................................................... 600/38–41
See application file for complete search history.

(56) References Cited

U.S. PATENT DOCUMENTS

| 2009/0099413 A1* | 4/2009 | Kobashikawa | A61H 19/34 600/38 |
| 2015/0141748 A1* | 5/2015 | Campbell | A61H 19/50 600/38 |
| 2015/0216561 A1* | 8/2015 | Alexander | A61B 1/00108 600/204 |

* cited by examiner

Primary Examiner — Samuel Gilbert
(74) Attorney, Agent, or Firm — Gulf Coast Intellectual Property Group

(57) ABSTRACT

A sexual aid device that is configured to provide pleasurable stimulation to an erogenous zone of a human body wherein the sexual aid is configured to transmit video images to a remote source. The sexual aid includes a body that is phallic in shape and includes a first end and a second end. A stimulation member is disposed within the body and is configured to provide vibration. A camera is installed on the second end of the body and is operable to provide video images to a transceiver mounted to said first end of said body. A control panel is secured to the second end of the body and is operable to provide control of the stimulation member and camera. A light is further included being secured to the second end of the body and further being adjacent to the camera.

4 Claims, 2 Drawing Sheets

SEXUAL AID

FIELD OF THE INVENTION

The present invention relates generally to marital aid devices, more specifically but not by way of limitation, a sexual aid that is operable to provide stimulation to erogenous zones of the human body wherein the sexual aid includes a camera and a transceiver configured to transmit a signal to a remote device such as but not limited to a computer.

BACKGROUND

The utilization of sexual aids is extremely common and is a multi-billion dollar a year business in the United States. A wide variety of sexual aids are available in the market place and are configured to be utilized by either men, women or both. Common aids that are utilized by women for self-pleasure includes dildos and other similar devices and as is known in the art can be provided with various features that are designed to stimulate specific parts of the female anatomy.

One gap in existing technology is the ability to provide video feedback to a user during utilization of the device. Depending on the user and the environment in which the sexual aid is being used it can be difficult for a user to position the device where a preferred response is achieved. Additionally, during intimate moments between sexual partners additional visual stimulation is desirable as the partner(s) can see certain physical effects and or reactions achieved by utilizing the device. Currently no sexual aid is available to provide the benefits of the aforementioned.

Accordingly, there is a need for a sexual aid that is configured to include elements operable to stimulate various regions of the human body and further provide a video signal to a remote device during the use thereof.

SUMMARY OF THE INVENTION

It is the object of the present invention to provide a sexual aid that is phallic is shape that includes an exterior body that is manufactured from a soft hygienic material such as but not limited to silicon.

Another object of the present invention is to provide a sexual aid that is configured to provide stimulation to various regions of the human body that includes a plurality of embodiments disposed on the exterior surface thereof.

A further object of the present invention is to provide a sexual aid that is configured to provide stimulation of areas of the human body such as but not limited to the vagina, that includes a base region wherein the base region includes electronics such as but not limited to a power supply and a transceiver.

Still another object of the present invention is to provide a sexual aid that is configured to be utilized by an individual or by a partner that includes at least one video camera disposed on an end of the sexual aid wherein the end is configured to be inserted into orifices of the human body and wherein the at least one video camera is operable to record video during use of the sexual aid.

An additional object of the present invention is to provide a sexual aid that is configured to provide pleasurable stimulation to various regions of the human body that includes an end configured to be insertable into an area of the human body that includes that further includes a least one light adjacent to the at least one camera.

Yet a further object of the present invention is to provide a sexual aid that is configured to provide pleasurable stimulation to erogenous zones of the human body that includes at least one transceiver wherein the transceiver is configured as a USB device.

Another object of the present invention is to provide a sexual aid that is operable to provide stimulation to various regions of the human body that includes a control panel formed in the base thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
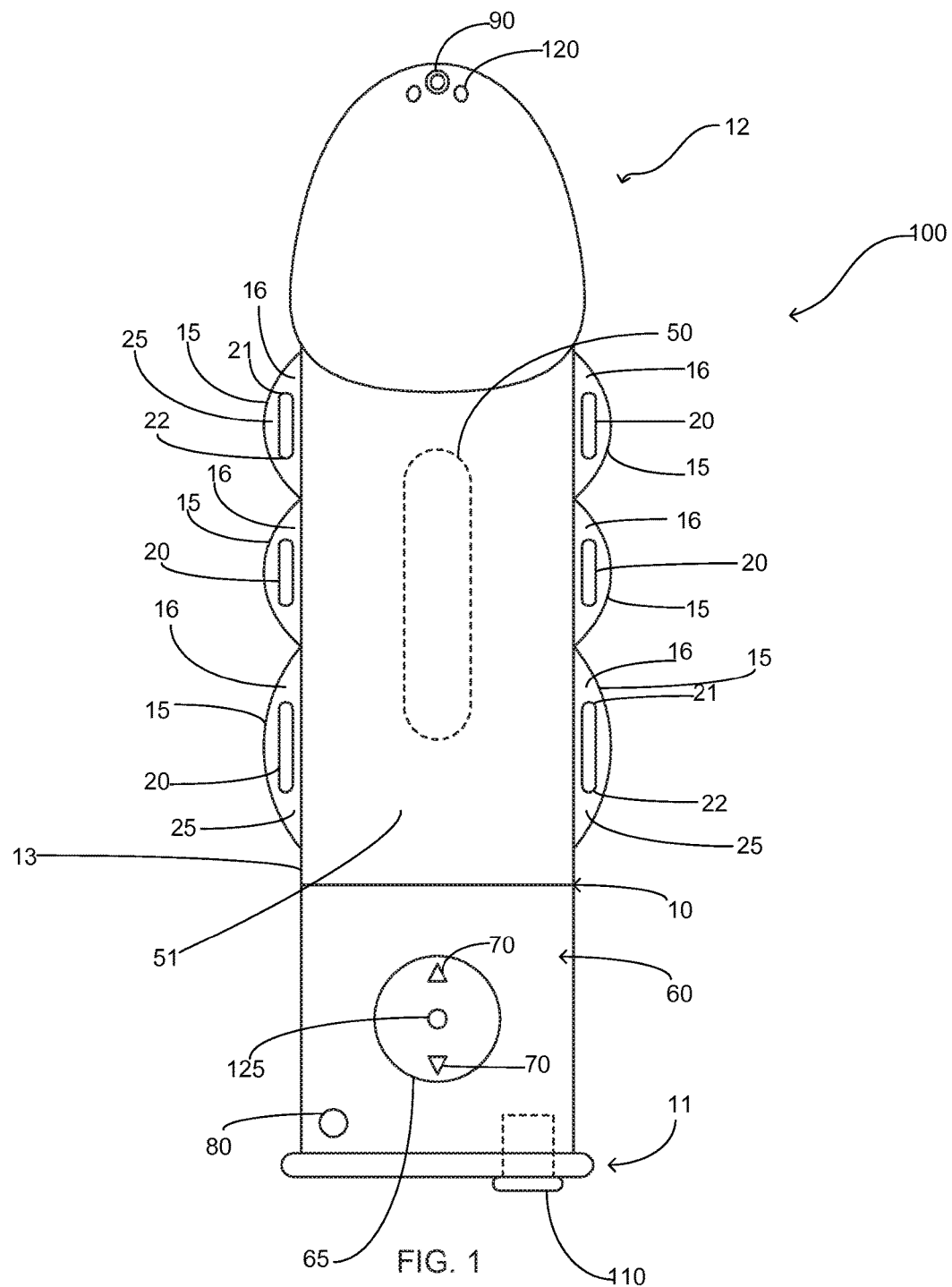
FIG. 1 is a diagrammatic view of an embodiment of the present invention.

Referring now to the drawings submitted herewith, wherein various elements depicted therein are not necessarily drawn to scale and wherein through the views and figures like elements are referenced with identical reference numerals, there is illustrated a sexual aid 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1 herein, the sexual aid 100 further includes a body 10 that is manufactured from a suitable durable comfortable material such as but not limited to silicon. The body 10 includes a first end 11 and a second end 12 wherein the second end 12 is half-domed in shape being configured to be insertable into an area of the human body such as but not limited to the vagina. The body 10 includes exterior surface 13. The exterior surface 13 further includes a plurality of pockets 15. The pockets 15 include outer layer 16 being contiguously formed with the exterior surface 13. The outer layer 16 of the pockets 15 is manufactured from a suitable durable material such as but not limited to silicon. The outer pockets 15 include disposed therein a vibratory motor 20. The vibratory motor 20 is a conventional vibratory motor that includes a power supply operably coupled to an offset counter weight so during activation of the vibratory motor 20 produces a vibration that is transferred through the suspension layer 25 and the outer layer 16 in order to provide pleasurable stimulation to an area of the human body. While one vibratory motor 20 is illustrated herein as being disposed within the pockets 15, it is contemplated within the scope of the present invention that the pockets 15 could have more than one vibratory motor 20 disposed therein. The suspension layer 25 of the pockets 15 are manufactured from a gel or similar material and function to provide dampening of the vibrations produced by the vibratory motor 20. The dampening of the vibrations produced by the vibratory motor 20 by the suspension layer 25 ensure that no damage or over stimulation occurs to the area of the human body to which the sexual aid 100 is being applied. The vibratory motor 20 is cylindrical in shape having rounded ends 21,22.

Figure 2:
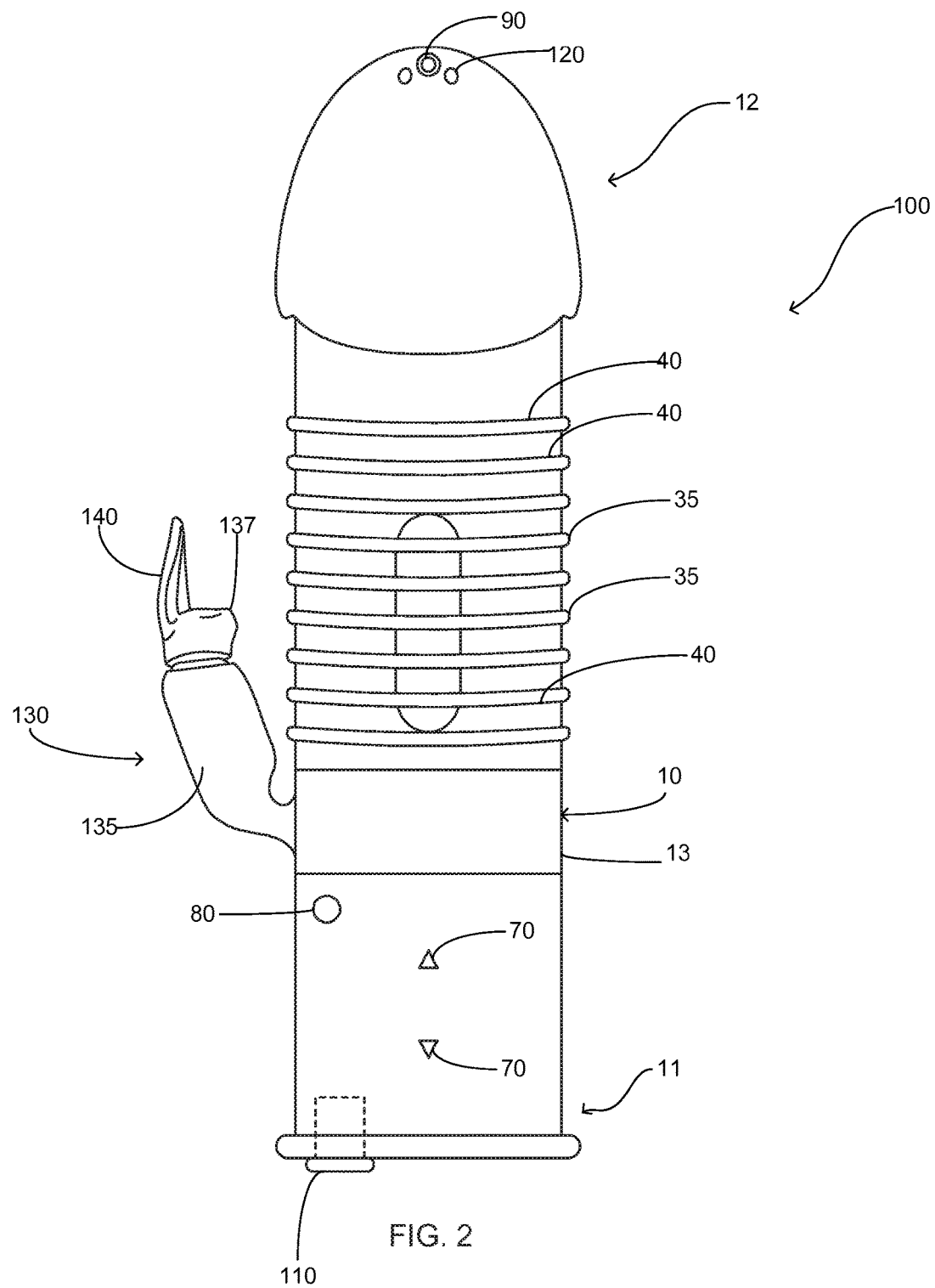
FIG. 2 is a diagrammatic view of an alternative embodiment of the present invention.

Referring in particular to FIG. 2 herein, the body 10 is illustrated having an alternative exterior surface 13 configuration wherein the body 10 includes a plurality of surroundably mounted ribs 40. The ribs 40 are contiguously formed with the exterior surface 13 and are manufactured from a suitable pliable material such as but not limited to silicon. It is contemplated within the scope of the present invention that numerous different amounts of ribs 40 could be formed on the body 10.

Disposed within the body 10 stimulation member 50. Stimulation member 50 is embedded within the body 10 and is proximate the upper surface 51. The stimulation member 50 includes at least one conventional vibratory motor disposed therein and is operable to provide vibratory stimulation to an area of a human body, in particular subsequent at least the partial insertion of the sexual aid 100 wherein the stimulation member 50 is consequently adjacent to an erogenous area such as but not limited to a clitoris. While one stimulation member 50 has been illustrated and discussed herein, it is contemplated within the scope of the present invention that the sexual aid 100 could have more than one stimulation member 50 disposed therein.

Integrally formed into the base region 60 of the body 10 is a control panel 65. The control panel 65 is configured to provide operation of the sexual aid 100. While not particularly illustrated herein the control panel 65 includes the necessary electronics to store, receive, transmit and manipulate data. The control panel 65 includes control buttons 70 that are operable to provide control of the stimulation member 50 and vibratory motors 20. The control panel 65 is electronically coupled to an internal power supply (not illustrated herein) such as but not limited to a battery pack. The internal power supply is operable to provide the necessary power to operate the stimulation member 50 and the vibratory motors 20. Control button 70 function to provide either an increase or decrease in the electrical current provided to the stimulation member 50 and vibratory motors 20 so as to control the amount of stimulation produced. The control panel 65 is electrically coupled utilizing suitable durable means to the power switch 80. Power switch 80 is a conventional power switch and is configured to provide control of the power from the internal power supply to the control panel 65.

The sexual aid 100 further includes camera 90. Camera 90 is embedded into second end 12 of the body 10 utilizing suitable techniques. The camera 90 is centrally located on the second end 12 of the body 10 and is operably coupled to transceiver 110. The camera 90 provides the ability to capture and subsequently transmit images during use of the sexual aid 100, in particular but not by way of limitation ensuing the insertion of the sexual aid into an orifice of the human body such as but not limited to the vagina. As is known in the art, an erogenous zone within the human vagina is commonly referred to as the g-spot. The g-spot is located on the front anterior wall of the vagina and when stimulated can produce strong sexual arousal. The camera 90 provides the ability of the user of the sexual aid 100 to see the location of the g-spot in order to utilize the sexual aid 100 to produce the desired effect. The camera 90 is further provided to provide additional visual images of internal portions of the human body that may assist in providing visual aid and/or pleasure to users of the sexual aid 100. Mounted on opposing sides of the camera 90 are lights 120. Lights 120 are LED lights and are operable to provide light proximate the camera 90 in order to ensure that a user can see the area of a human body which the camera 90 is capturing images thereof and wherein the images are being transmitted to a remote device via the transceiver 110. While two lights are illustrated herein, it is contemplated within the scope of the present invention that the sexual aid 100 could be configured with alternate quantities of lights 120 in order to achieve the desired objective. The camera 90 is controlled by switch 125 that is disposed on control panel 65. Switch 125 while not particularly illustrated herein is an illuminated switch so as to provide indication to a user of the sexual aid 100 as to when the camera 100 is activated and capturing video images.

The transceiver 110 is coupled to the base region 60 of the body 10 and is electrically coupled to the camera 90 utilizing suitable techniques. The transceiver 110 includes the necessary electronics so as to transmit and receive data signal such as but not limited to video data signals. The transceiver 110 is configured to transmit video images captured by the camera 90 to a remote device such as but not limited to computer or tablet pc. It is contemplated within the scope of the present invention that the transceiver 110 could be configured to utilize various wireless protocols to transmit data such as but not limited to Bluetooth or alternate wireless protocols.

Shown in particular in FIG. 2 herein is the clitoral stimulation member 130. Clitoral stimulation member 130 is secured to the exterior surface 13 of the body 10 utilizing suitable durable techniques and is manufactured from a suitable material such as but not limited to silicon rubber. The clitoral stimulation member 130 include base 135 being barrel-shaped wherein the base 135 is contiguously formed with the projection member 140 and end member 137. Projection member 140 and end member 137 are positioned such that subsequent the insertion of the sexual aid into a human vagina the projection member 140 and end member 137 are adjacent to the clitoral region and operable to provide stimulation thereof. While a particular configuration of the clitoral stimulation member 130 is illustrated and discussed herein, it is contemplated within the scope of the present invention that the clitoral stimulation member 130 could be configured in alternate manners and still achieve the desired objective as stated herein.

While not particularly illustrated herein, it is contemplated within the scope of the present invention that the sexual aid 100 is configured to be electrically coupled to a conventional power source so as to provide recharging of an internal power supply. It is further contemplated within the scope of the present invention that the exterior surface 13 of the body 10 could be configured with various stimulation members in addition to or in conjunction with the pockets 15 and ribs 40.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A sexual aid comprising:
    a body, said body being phallic in shape, said body having a first end and a second end, said first end of said body being half-domed shaped, said body having an exterior surface, said body including a top surface, said first end of said body being configured to be inserted into a vaginal aperture of a human body;
    wherein said exterior surface of said body having a plurality of pockets, said plurality of pockets having an interior volume, said plurality of pockets being contiguously formed with said exterior surface such that said interior volume of said plurality of pockets is adjacent said exterior surface of said body, said plurality of pockets being diametrically opposed on said body, said plurality of pockets extending intermediate said first end and said second end of said body in a linear configuration, said plurality of pockets being filled with gel, said plurality of pockets having a vibratory motor suspended in said gel, said vibratory motor configured to provide vibrations, said plurality of pockets having a vibratory device disposed therein;
    a camera, said camera being integrated into said first end of said body so as to capture photographic images inside a vagina;
    a transceiver, said transceiver operably coupled to said camera, said transceiver mounted proximate said second end of said body, said transceiver configured to transmit video signals from said camera to a remote device;
    a control panel, said control panel being formed in said second end of said body, said control panel being operably coupled to said camera, said control panel operably coupled with said vibratory device disposed within said plurality of pockets; and
    a clitoral stimulation member, said clitoral stimulation member having an end member and a projection member, said end member and said projection member being perpendicular.

2. The sexual aid as recited in claim 1, wherein said control panel further includes control buttons, said control button operable to either increase or decrease the power to the stimulation member, the vibratory device and the camera.

3. The sexual aid as recited in claim 2, wherein said clitoral stimulation member further includes a base, said base being barrel-shaped.

4. The sexual aid as recited in claim 3, wherein said body is manufactured from silicon rubber.

* * * * *